(12) United States Patent
Yamaguchi

(10) Patent No.: US 7,163,072 B2
(45) Date of Patent: Jan. 16, 2007

(54) MOTOR-DRIVEN VEHICLE DRIVE CONTROL APPARATUS AND METHOD THEREOF

(75) Inventor: Yasuo Yamaguchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 237 days.

(21) Appl. No.: 10/475,450

(22) PCT Filed: Dec. 20, 2002

(86) PCT No.: PCT/JP02/13365

§ 371 (c)(1),
(2), (4) Date: Oct. 20, 2003

(87) PCT Pub. No.: WO03/053734

PCT Pub. Date: Jul. 3, 2003

(65) Prior Publication Data

US 2004/0129465 A1    Jul. 8, 2004

(30) Foreign Application Priority Data

Dec. 21, 2001   (JP)   ............... 2001-390500

(51) Int. Cl.
*B60K 6/02*  (2006.01)
(52) U.S. Cl. .................................... 180/65.2
(58) Field of Classification Search ............... 180/65.1, 180/65.2, 65.3, 65.4; 310/156.01, 156.22; 318/254, 139
See application file for complete search history.

(56) References Cited

U.S. PATENT DOCUMENTS

| | | | |
|---|---|---|---|
| 4,165,795 A * | 8/1979 | Lynch et al. ............... | 180/65.2 |
| 4,196,377 A * | 4/1980 | Boxer .......................... | 318/269 |
| 5,038,065 A | 8/1991 | Matsubayashi et al. | |
| 5,679,995 A | 10/1997 | Nagate et al. | |
| 5,682,073 A | 10/1997 | Mizuno | |
| 5,717,316 A * | 2/1998 | Kawai ......................... | 322/46 |
| 5,864,191 A * | 1/1999 | Nagate et al. ......... | 310/156.54 |
| 6,226,163 B1 * | 5/2001 | Bernhoff et al. ........... | 361/93.1 |
| 6,400,107 B1 * | 6/2002 | Nakatani et al. ............ | 318/254 |

FOREIGN PATENT DOCUMENTS

| | | |
|---|---|---|
| JP | 1-286758 | 11/1989 |
| JP | 6-351206 | 12/1994 |
| JP | 7-143694 | 6/1995 |
| JP | 9-271151 | * 10/1997 |
| JP | 10-146031 | 5/1998 |
| JP | 10-150704 | 6/1998 |
| JP | 10-262359 | 9/1998 |
| WO | WO 94/05075 | 3/1994 |

* cited by examiner

Primary Examiner—Frank Vanaman
(74) Attorney, Agent, or Firm—Oliff & Berridge, PLC

(57) ABSTRACT

A vehicle drive control apparatus including a motor, a battery, an inverter having a direct current supplied from the battery, wherein the inverter converts the direct current into an alternating current and supplies the alternating current to the motor and a controller that transmits a drive signal to the inverter so as to execute a weak field control, wherein a charging current supplied to the battery, at a time when execution of the weak field control is not allowed, is set to be smaller than an overcharging current indicating a maximum value of an electric current charged in the battery.

6 Claims, 6 Drawing Sheets

MOTOR-DRIVEN VEHICLE DRIVE CONTROL APPARATUS AND METHOD THEREOF

BACKGROUND OF THE INVENTION

1. Field of Invention

The invention relates to a motor-driven vehicle drive control apparatus and method thereof.

2. Description of Related Art

Conventionally, there exists a vehicle driving apparatus that is mounted on an electric car. The vehicle driving apparatus generates a motortorque and transmits the motor torque to a drive wheel. In this vehicle driving apparatus, a motor is driven by a direct current application from a battery at a time of power running (driving), generates the motor torque, is exposed to a torque caused by an inertia of the electric car at a time of regeneration (power generation), generates a direct current, and supplies the electric current to the battery.

Further, there exists a vehicle driving apparatus that is mounted on a hybrid vehicle that serves as a motor-driven vehicle. The vehicle driving apparatus transmits part of an engine torque to a power generator (a power generator motor) corresponding to a first motor-driven machine and the rest of the engine torque to a drive wheel. In this vehicle driving apparatus, the vehicle driving apparatus has a planetary gear unit provided with a sun gear, a ring gear and a carrier. The carrier is connected to the engine, the ring gear is connected to the drive wheel, the sun gear is connected to the power generator, and a rotation output from the ring gear and a motor corresponding to a second motor-driven machine is transmitted to the drive wheel, whereby a driving force is generated.

In the above vehicle driving apparatus, a motor control apparatus is arranged in each vehicle driving apparatus. Both of the motor control apparatuses are structured such that a feedback control in accordance with a vector control computation is executed on a d-q axes model in which an axis d and an axis q are respectively placed in a direction of a magnetic pole pair of a rotor in the motor and in a direction perpendicular to the axis d, at a time of supplying the electric current from the battery to the motor and at a time when the motor-driven vehicle is driven by the motor. Further, when the motor is driven at a high speed in the feedback control, an induced voltage becomes high, and a sufficient motor torque can not be generated. Accordingly, when the motor is driven at a high speed, a weak field control is executed by reducing an amount of magnetic flux formed by the d-axis current.

SUMMARY OF THE INVENTION

However, in the conventional vehicle driving apparatus mentioned above, when the weak field control can not be executed, for example, when the motor control apparatus can not execute the control because of a disturbance caused by noise, physical damage and the like, and at least one of three wires for supplying the electric current to an inverter and to the motor from the inverter is physically broken, a high counter-electromotive voltage is generated, an excess current is supplied to the battery accompanying therewith, and the battery is overcharged. In general, since a battery having a comparatively high voltage (for example, 144, 288 or 312 [V]) is used in the electric car or the hybrid vehicle, the electric current supplied to the battery is small. Therefore, the structure is made such that when the excess current is going to be supplied to the battery, the excess current is prevented from being supplied to the battery by disconnecting a relay on a direct-current cable.

On the contrary, for example, when the electric car or the hybrid vehicle, in which a battery having a comparatively low voltage (for example, 42 [V]) is employed, the electric current supplied to the battery is greater by just that much. Accordingly, when it is intended to disconnect the relay on the direct-current cable when the excess current is going to be supplied to the battery, the relay is on a large scale. Therefore, the vehicle driving apparatus is large-scaled.

The invention thus provides a motor-driven vehicle drive control apparatus which can solve the problems in the conventional vehicle driving apparatus mentioned above, can prevent an excess current from being supplied to a battery, and can make the apparatus compact.

In order to achieve the foregoing and other advantages, a vehicle drive control apparatus according to a first exemplary aspect of the invention includes a motor, a battery, an inverter having a direct current supplied from the battery, wherein the inverter converts the direct current into an alternating current and supplies the alternating current to the motor and a controller. The controller transmits a drive signal to the inverter so as to execute a weak field control, wherein a charging current supplied to the battery, at a time when execution of the weak field control is not allowed, is set to be smaller than an overcharging current indicating a maximum value of an electric current charged in the battery.

In this case, the charging current supplied to the battery, at a time when the weak field control can not be executed, is made smaller than the overcharging current expressing the maximum value of the electric current charged in the battery. Accordingly, even when the weak field control can not be executed and the high counter-electromotive voltage is generated, it is possible to prevent the excess current from being supplied to the battery, and the battery is not overcharged. Further, since it is not necessary to make the relay on the direct-current cable large scaled, the vehicle driving apparatus is made compact.

A vehicle drive control apparatus according to a second exemplary aspect of the invention includes a motor with a rotor including a plurality of permanent magnets arranged in a plurality of portions in a circumferential direction and salient poles arranged between the permanent magnets, a battery, an inverter having a direct current supplied from the battery, wherein the inverter converts the direct current into an alternating current and supplies the alternating current to the motor and a controller. The controller transmits a drive signal to the inverter so as to execute a weak field control, wherein a reluctance torque coefficient is set to be equal to or more than 40, the reluctance torque coefficient calculated by dividing a torque constant, determined based on the motor torque and the alternating current supplied to the motor, by a counter-electromotive constant, the counter-electromotive constant calculated by dividing a maximum counter-electromotive voltage generated at a time when execution of the weak field control is not allowed by a maximum value of a motor rotation speed.

In this case, since the reluctance torque coefficient is set to be equal to or more than 40, the use ratio of the reluctance torque is made higher in the magnet torque generated by the permanent magnet, and the reluctance torque generated by the salient poles. Accordingly, it is possible to prevent the battery from being overcharged, and it is possible to generate a sufficient motor torque.

BRIEF DESCRIPTION OF THE DRAWINGS

Various embodiments of the invention will be described with reference to the drawings, wherein.

DETAILED DESCRIPTION OF PREFERRED EMBODIMENTS

A description will be given in detail below of embodiments according to the invention with reference to the accompanying drawings. In this case, a description will be given of a vehicle driving apparatus for driving a hybrid vehicle, provided with an engine, that serves as a motor-driven vehicle. In place of the hybrid vehicle provided with an engine and a motor, the motor-driven vehicle, of the invention can be applied to a vehicle driving apparatus for driving an electric car which is not provided with an engine and is provided only with a motor, a hybrid vehicle which is provided with an engine, a power generator and a motor, and the like.

Figure 1:
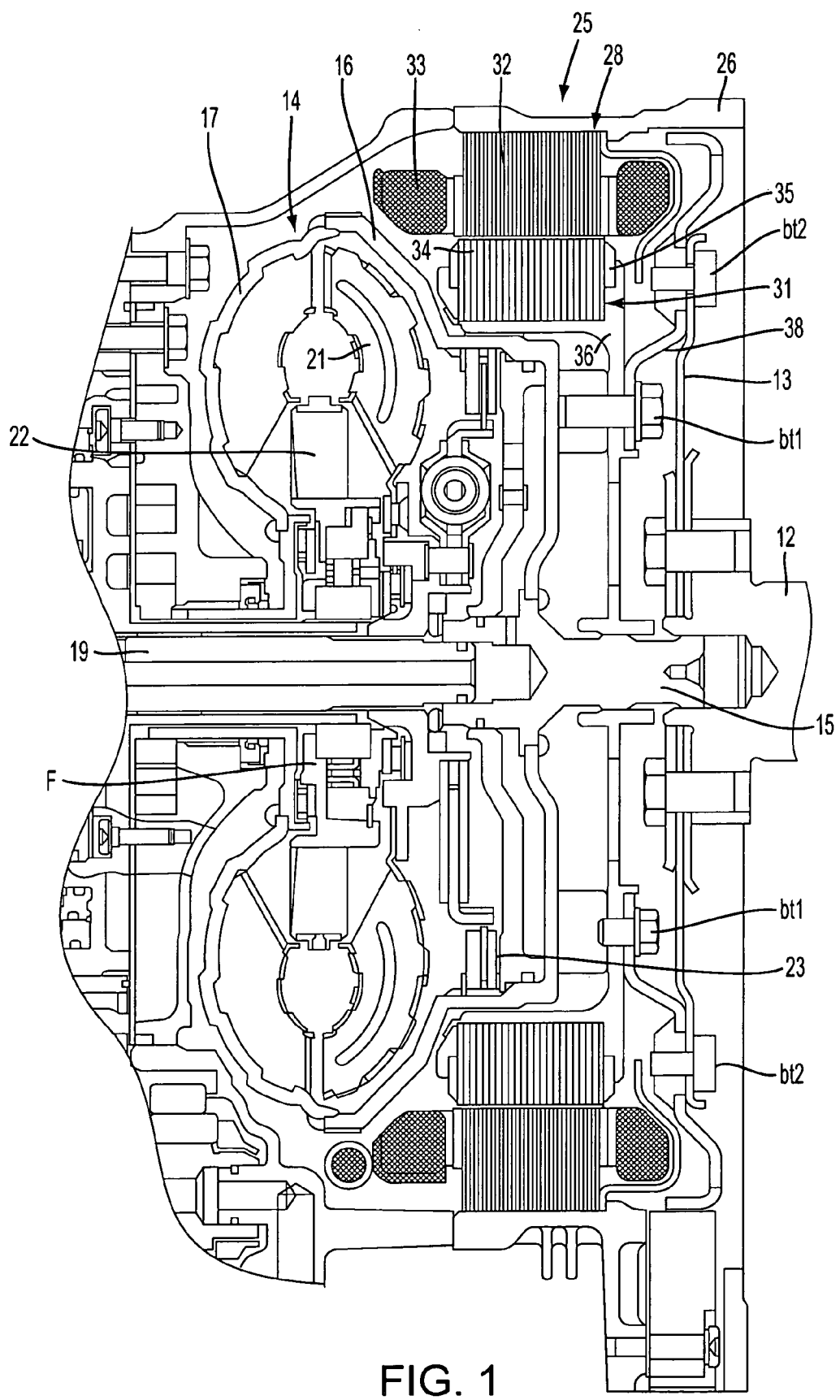
FIG. 1 is a schematic view of a main portion of a vehicle driving apparatus according to a first embodiment of the invention.

FIG. 1 is a schematic view of a main portion of a vehicle driving apparatus according to a first embodiment of the invention. In the drawing, reference numeral 12 denotes a crank shaft that serves as an output shaft directly connected to an engine (not shown), reference numeral 13 denotes a drive plate, reference numeral 14 denotes a torque converter that serves as a fluid transmission gear, reference numeral 25 denotes a motor that serves as a motor-driven machinery, and reference numeral 15 denotes a center piece of the torque converter 14. The torque converter 14 is provided with the center piece 15, a front cover 16 connected to the center piece 15, a pump impeller 17 connected to the front cover 16, a turbine runner 21 arranged so as to oppose to the pump impeller 17, forming a torus together with the pump impeller 17 and connected to an input shaft 19 of a gear box via a turbine hub 18, a stator 22, a detachably arranged lockup clutch apparatus 23, and a damper apparatus 24 absorbing a fluctuation of a torque transmitted via the torque converter 14, that is, a transmission torque.

Further, in the torque converter 14, a rotation transmitted from the engine is transmitted to the front cover 16 via the crank shaft 12, and is transmitted to the pump impeller 17 fixed to the front cover 16. In this case, when the pump impeller 17 is rotated, oil within the torus flows around an axis of the torque converter 14, is circulated among the pump impeller 17, the turbine runner 21 and the stator 22 due to a centrifugal force application, rotates the turbine runner 21, and is transmitted to the input shaft 19.

When a difference in a rotation speed between the pump impeller 17 and the turbine runner 21 is large just after the pump impeller 17 starts rotating, such as a starting time or the like of the hybrid vehicle, the oil flowing out from the turbine runner 21 flows in a direction of preventing the rotation of the pump impeller 17. Accordingly, the stator 22 is arranged between the pump impeller 17 and the turbine runner 21, and the stator 22 changes the oil flow in a direction of assisting the rotation of the pump impeller 17, at a time when the difference of rotation speed between the pump impeller 17 and the turbine runner 21 is large.

Further, when the rotation speed of the turbine runner 21 becomes high, and the difference in rotation speed between the pump impeller 17 and the turbine runner 21 becomes small, the oil brought into contact with a front side of a blade in the stator 22 is going to be brought into contact with a back side thereof, whereby the oil flow is prevented. In order to allow the stator 22 to rotate only in a fixed direction, a one-way clutch F is arranged in an inner peripheral side of the stator 22. Thus, when the oil is going to be brought into contact with the back side of the blade, the stator 22 is going to be naturally rotated by the one-way clutch F, so that the oil is smoothly circulated.

When a preset vehicle speed is obtained after the hybrid vehicle is started, a lockup clutch apparatus 23 is engaged, and the rotation of the engine is directly transmitted to the input shaft 19 without involving oil. In this case, the motor 25 is provided with a stator 28 fixed to a vehicle driving apparatus case 26, and a rotor 31 is mounted to the center piece 15 on an inner side in the radial direction rather than on the stator 28. The rotor 31 is also rotatably arranged with respect to the stator 28. The stator 28 is provided with a stator core 32, and a coil 33 wound around the stator core 32. The rotor 31 is provided with a rotor core 34 and a plurality of permanent magnets 35 arranged in a plurality of portions in a circumferential direction of the rotor core 34. The rotor 31 is centered to the center piece 15 via a rotor hub 36, and the rotor hub 36 is connected to the front cover 16 and is connected to the drive plate 13 via an annular plate 38. In this case, reference symbols bt1 and bt2 denote a bolt.

Figure 2:
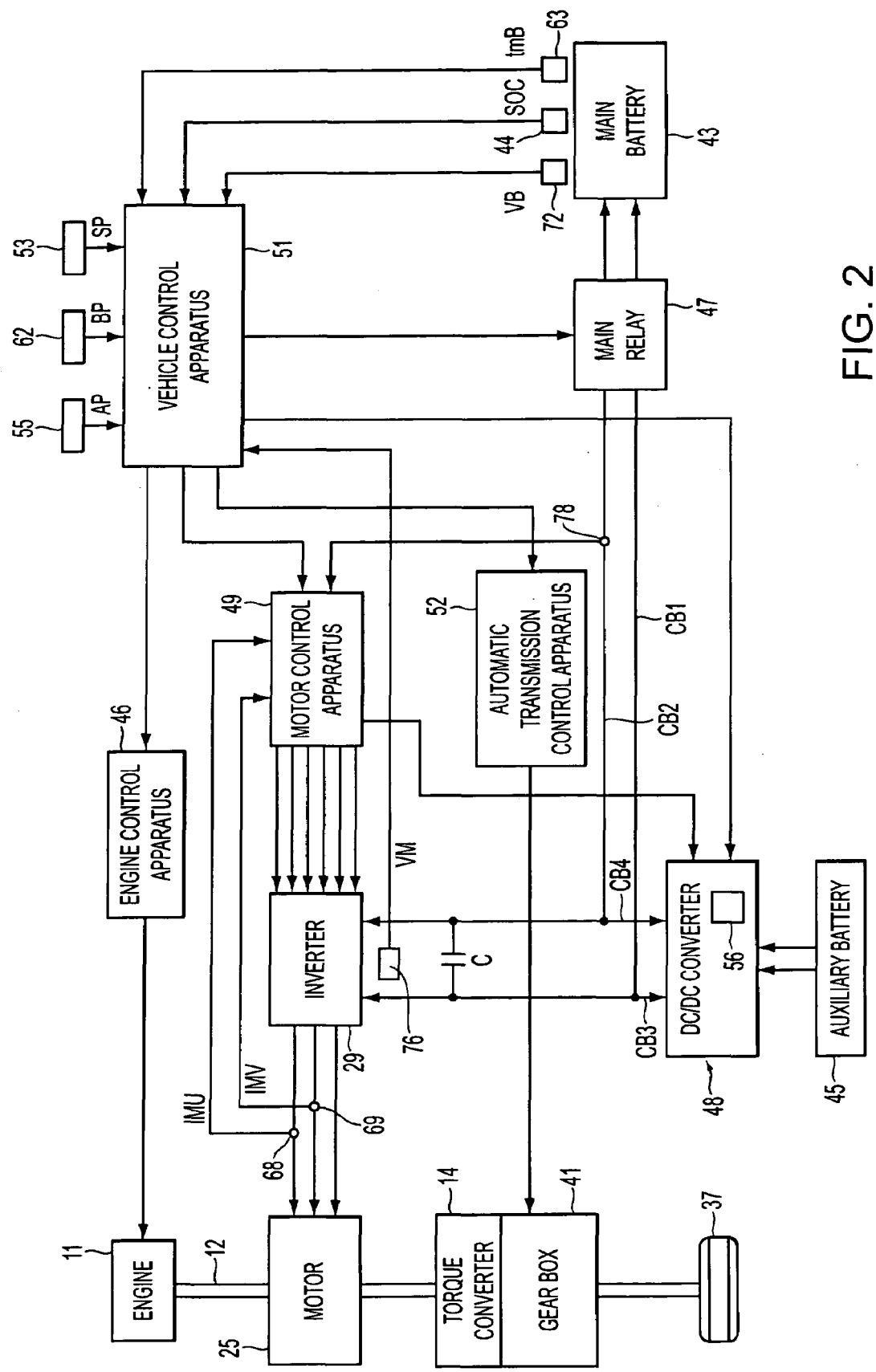
FIG. 2 is a block diagram showing a hybrid vehicle drive control apparatus according to the first embodiment of the invention.

Next, a description will be given of the hybrid vehicle drive control apparatus corresponding to the motor-driven vehicle drive control apparatus. FIG. 2 is a block diagram showing a hybrid vehicle drive control apparatus according to the first embodiment of the invention.

In the drawing, reference numeral 11 denotes an engine, reference numeral 12 denotes a crank shaft, reference numeral 14 denotes a torque converter, reference numeral 25 denotes a motor, reference numeral 29 denotes an inverter that serves as a motor inverter for driving the motor 25, reference numeral 37 denotes a drive wheel, reference numeral 41 denotes a gear box connected to the torque converter 14 and changing the rotation output from the torque converter 14 according to a predetermined transmission speed range, reference numeral 43 denotes a main battery that serves as a first battery forming a power source for making the hybrid vehicle travel, and reference numeral 45 denotes an auxiliary battery that serves as a second battery forming a power source for operating auxiliary machines of the hybrid vehicle. The inverter 29 is connected to the main battery 43 via a main relay 47 that serves as a relay and direct current cables CB1 and CB2, and a direct current is supplied to the inverter 29 from the main battery 43. Further, the main battery 43 is connected to a DC/DC converter 48 via the main relay 47, the direct current cables CB1 and CB2, and direct current cables CB3 and CB4 branched from the direct current cables CB1 and CB2, and the DC/DC converter 48 and the auxiliary battery 45 are connected.

In the present embodiment, an electric voltage corresponding to a first power source voltage in the main battery 43 is 42 [V], an electric voltage corresponding to a second power source voltage in the auxiliary battery 45 is 12 [V], and the DC/DC converter 48 converts the electric voltage of 42 [V] into the electric voltage of 12 [V] or converts the electric voltage of 12 [V] into the electric voltage of 42 [V]. Further, a switch 56 is arranged within the DC/DC converter 48. It is possible to operate the DC/DC converter 48 or stop the operation of the DC/DC converter 48 by turning on or off the switch 56.

A motor inverter voltage sensor 76 that serves as a direct current voltage detecting portion is arranged in an inlet side of the inverter 29 for detecting a direct current voltage applied to the inverter 29, that is, a motor inverter voltage VM. A motor inverter current sensor 78 corresponding to a direct current detecting portion is arranged in a predetermined portion of the direct current cable CB2 for detecting a direct current supplied to the inverter 29, that is, a motor inverter current IM. Further, the motor inverter voltage VM is fed to a vehicle control apparatus 51, and the motor inverter current IM is fed to a motor control apparatus 49. In this case, a smoothing condenser C is connected between the main battery 43 and the inverter 29.

Further, the vehicle control apparatus 51 comprises a CPU, a recording apparatus and the like which are not illustrated, executes an entire control of the vehicle driving apparatus, and functions as a computer on the basis of a predetermined program, data and the like. The vehicle control apparatus 51 is connected to the engine control apparatus 46, the motor control apparatus 49 and an automatic transmission control apparatus 52. Further, the engine control apparatus 46 comprises a CPU, a recording apparatus and the like which are not illustrated, and transmits an instruction signal such as a throttle opening degree θ, a valve timing and the like, for controlling the engine 11. Further, the motor control apparatus 49 comprises a CPU, a recording apparatus and the like which are not illustrated, and transmits a drive signal to the inverter 29 for controlling the motor 25. Further, the automatic transmission control apparatus 52 comprises a CPU, a recording apparatus and the like which are not illustrated, and transmits respective signals such as a solenoid signal and the like to the gear box 41 for controlling the automatic transmission. In this case, a first control apparatus comprises the engine control apparatus 46, the motor control apparatus 49 and the automatic transmission control apparatus 52, and a second control apparatus existing in a superior position of the first control position comprises the vehicle control apparatus 51. Further, the engine control apparatus 46, the motor control apparatus 49 and the automatic transmission control apparatus 52 function as a computer on the basis of a predetermined program, data and the like, in the same manner as that of the vehicle control apparatus 51.

The inverter 29 is driven in accordance with the drive signal, is exposed to the direct current from the main battery 43 at a time of power running, generates respective phases of currents IMU, IMV and IMW, supplies the respective phase of currents IMU, IMV and IMW to the motor 25, receives the respective phase of currents IMU, IMV and IMW from the motor 25 at a time of regeneration, generates a direct current and supplies the direct current to the main battery 43.

Further, reference numeral 44 denotes a battery state-of-charge detecting apparatus for detecting a state of the main battery 43, that is, a battery state-of-charge SOC corresponding to a battery state, reference numeral 53 denotes a shift position sensor for detecting a position of a shift lever (not shown) that serves as a shift operating portion, that is, a shift position SP, reference numeral 55 denotes an accelerator switch that serves as a engine load detecting portion and an accelerator operation detecting portion for detecting a position (a depressed amount) of an accelerator pedal (not shown), that is, an accelerator pedal position AP, reference numeral 62 denotes a brake switch that serves as a brake operation detecting portion for detecting a position (a depressed amount) of a brake pedal (not shown), that is, a brake pedal position BP, and reference numeral 63 denotes a battery temperature sensor that serves as a temperature detecting portion for detecting a temperature tmB of the main battery 43. In this case, a load applied to the engine 11, that is, an engine load is expressed by the accelerator pedal position AP.

Further, reference numerals 68 and 69 denote an electric current sensor that serves as an alternating current detecting portion and a temperature detecting portion for detecting the respective phase of currents IMU and IMV, and reference numeral 72 denotes a battery voltage sensor corresponding to a voltage detecting portion for the main battery 43 for detecting the battery voltage VB corresponding to the battery state. The battery voltage VB is fed to the vehicle control apparatus 51. Further, it is possible to detect a battery current, a battery temperature and the like as the battery state. In this case, a battery state detecting portion comprises the battery state-of-charge detecting apparatus 44, the battery voltage sensor 72 and the battery current sensor (not shown), the battery temperature sensor (not shown) and the like. Further, the currents IMU and IMV are supplied to the motor control apparatus 49 and the vehicle control apparatus 51.

The vehicle control apparatus 51 transmits the engine control signal to the engine control apparatus 46, and makes the engine control apparatus 46 set the drive and stop of the engine 11. Further, vehicle speed calculating processing means (not shown) of the vehicle control apparatus 51 executes vehicle speed calculating processing, reads a position of the rotor 31 (FIG. 1) of the motor 25, that is, a rotor position, calculates a change rate of the rotor position, and calculates a vehicle speed on the basis of the change rate, and a gear ratio in a torque transmission system from the center piece 15 to the drive wheel 37.

Further, the vehicle control apparatus 51 sets an engine target rotation speed NE* expressing a target value of the engine rotation speed NE, and a motor target torque TM* expressing a target value of the motor torque TM. In the present embodiment, the structure is made such that the motor 25 is used as a starter for starting the engine 11, and is also used as a power generator. However, the structure may be made such that the motor 25 is used as an auxiliary drive source at a time when the engine torque TE is changed due to a change in the throttle opening degree θ of the engine 11.

Next, a description will be given of an operation of the motor control apparatus 49. In this case, the motor control apparatus 49 executes a feedback control in accordance with a vector control computation on a d-q axes model in which an axis d and an axis q are respectively placed in a direction of a magnetic pole pair of the rotor 31 in the motor 25 and in a direction perpendicular to the axis d.

First, motor rotation speed calculating processing means (not shown) of the motor control apparatus 49 executes motor rotation speed calculating processing, reads the rotor position and calculates a change rate of the rotor position, thereby calculating the rotation speed of the motor 25, that is, a motor rotation speed NM.

Subsequently, motor control processing means (not shown) of the motor control apparatus 49 executes motor control processing, reads the motor target torque TM* and the battery voltage VB, makes reference to a current instruction value map for controlling the motor recorded in the recording apparatus of the motor control apparatus 49 on the basis of the motor rotation speed NM, the motor target torque TM* and the battery voltage VB, and calculates and determines a d-axis current instruction value IMd* and a q-axis current instruction value IMq*.

Further, the motor control processing means reads the electric currents IMU and IMV from the current sensors 68 and 69, and calculates the electric current IMW on the basis of the electric currents IMU and IMV in accordance with the formula IMW=IMU−IMV. In this case, the electric current IMW may be detected by the current sensor in the same manner as the electric currents IMU and IMV.

Subsequently, alternating current calculating processing means (not shown) of the motor control processing means executes alternating current calculating processing, and calculates a d-axis current IMd and a q-axis current IMq corresponding to the alternating current. For this purpose, the alternating current calculating processing means executes a three-phase/two-phase conversion so as to convert the electric currents IMU, IMV and IMW into the d-axis current IMd and the q-axis current IMq. Further, alternating voltage instruction value calculating processing means (not shown) of the motor control processing means executes alternating voltage instruction calculating processing, and calculates voltage instruction values VMd* and VMq* on the basis of the d-axis current IMd, the q-axis current IMq, the d-axis current instruction value IMd* and the q-axis current instruction value IMq*. Further, the motor control processing means executes a two-phase/three-phase conversion so as to convert the voltage instruction values VMd* and VMq* into the voltage instruction values VMU*, VMV* and VMW*, calculates pulse width modulation signals SU, SV and SW on the basis of the voltage instruction values VMU*, VMV* and VMW*, and outputs the pulse width modulation signals SU, SV and SW to drive processing means (not shown) of the motor control apparatus 49. The drive processing means executes drive processing, and transmits a drive signal to the inverter 29 on the basis of the pulse width modulation signals SU, SV and SW. The feedback control is executed in the manner mentioned above.

In this case, when this kind of motor 25 is driven at a high speed, an induced voltage becomes high, and a sufficient motor torque TM can not be generated. Accordingly, a weak field control means (not shown) of the motor control apparatus 49 executes weak field control processing so as to make the d-axis current instruction value IMd* small at a time when the motor 25 is driven at a high speed, for example, at a time when the motor rotation speed NM is a threshold value, thereby executing the weak field control by reducing an amount of magnetic flux in a magnetic field formed by the d-axis current IMd.

However, if the weak field control can not be executed for some reason, for example, because the motor control apparatus 49 can not execute the control due to a disturbance caused by a noise, a physical damage or the like, or the inverter 29 and at least one of three wires for supplying the electric currents IMU, IMV and IMW to the motor 25 from the inverter 29, a high counter-electromotive voltage E0 is generated. Further, if the excess current is supplied to the main battery 43 accompanying therewith, the main battery 43 is excessively charged. Since the main battery having a comparatively (for example, 144, 288 and 312 [V]) is generally used in the electric car or the hybrid vehicle, the electric current supplied to the main battery is small. Accordingly, if the excess current is going to be supplied to the main battery, a relay on the direct-current cable is disconnected, whereby it is possible to prevent the excess current from being supplied to the battery.

On the contrary, in the case of the electric car or the hybrid vehicle employing the main battery 43 having a comparatively low voltage (for example, 42 [V]), as in the present embodiment, the electric current supplied to the main battery 43 is larger by just that much. Accordingly, when the main relay 47 is intentionally disconnected on the direct-current cables CB1 and CB2 at a time when the excess current is going to be supplied to the main battery 43, the main relay 47 becomes large scaled. Therefore, not only the vehicle driving apparatus is large scaled, but also a micro arcing phenomenon is generated, so that a long time is required until the main relay 47 is disconnected.

As a result, the excess current is supplied to the main battery 43, and the main battery 43 is excessively charged. Further, for example, when a nickel hydride battery is used as the main battery 43, generation amounts of hydrogen gas and oxygen gas are increased due to an overcharge of the main battery 43.

Specifically, reactions shown by the following formulas are generated in a nickel positive electrode and an MH negative electrode of the nickel hydride battery.

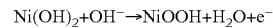

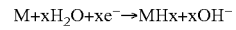

As a matter of fact, a water generation is not sufficient in the nickel positive electrode at an end stage of the charging, at the excessively charging time or the like, whereby the oxygen gas is generated. Further, an occlusion in a hydrogen absorbing alloy is not sufficient in the MH negative electrode, so that the hydrogen gas is generated.

For example, in the case that in the electric current 300 [A] supplied to the main battery 43, the electric current 200 [A] is used for charging, and the rest of the electric current 100 [A] is used for generating the oxygen gas and the hydrogen gas, a gas amount of the oxygen gas and the hydrogen gas generated per second can be calculated by the following formula. Specifically, a quantity of electricity Q of the electric current 100 [A] is obtained by the following formula.

$$Q = 100[A] \times 1[s]$$
$$= 100[C]$$
$$= 100/96490[F]$$
$$= 10.36 \times 10^{-4}[F]$$

In this case, when 0.5 [mol] of the hydrogen gas is generated and 0.25 [mol] per 1 [F] of the oxygen gas is generated, the following amount of substance of the hydrogen gas is generated.

$$10.36 \times 10^{-4}/2 = 5.18 \times 10^{-4} \ [mol] \ \text{in} \ 10.36 \times 10^{-4} \ [F]$$

The following amount of the oxygen gas is generated.

$$10.36 \times 10^{-4}/4 = 2.59 \times 10^{-4} \ [mol] \ \text{in} \ 10.36 \times 10^{-4} \ [F]$$

Further, a volume of the hydrogen gas is as follows.

$$22400 \ [ml] \times 5.18 \times 10^{-4} = 11.603 \ [ml]$$

A volume of the oxygen gas is as follows.

$$22400\ [ml] \times 2.59 \times 10^{-4} = 5.802\ [ml]$$

Further, even during a period when a normal charging is executed, the hydrogen gas and the oxygen gas are slightly generated. Therefore, the water is generated by immediately recombining the hydrogen gas and the oxygen gas generated at a time of designing the main battery 43. In this case, an exposed nickel surface of the nickel hydride battery constitutes a catalyst, thereby promoting recombination of the hydrogen gas and the oxygen gas.

In this case, if the hydrogen gas and the oxygen gas are stored too much within the main battery 43, the hydrogen gas and the oxygen gas are rapidly recombined, undesirably.

Assumingly, an overcharging current IBmax [A] expressing a maximum value of the electric current charged in the main battery 43 and defined as a rated current for each kind of the main battery 43 is set to a limit value corresponding to the main battery 43, and a current that is supplied to the main battery 43 at a time when the weak field control can not be executed is set as a charging current Ib [A]. In this case, the vehicle driving apparatus is designed and an equipment constant of the vehicle driving apparatus is set so that the relation in the following formula (1) is established.

$$Ib < IBmax \qquad (1)$$

Assumingly, a current when the hydrogen gas and the oxygen gas are stored too much within the main battery 43 and the hydrogen gas and the oxygen gas are rapidly recombined is a limit current IBLT [A], the overcharging current IBmax defined as a rated current in the present embodiment can be calculated by multiplying a limit current IBLT [A] with a safety factor $\rho$ in accordance with the following formula.

$$IBmax = \rho \cdot IBLT$$

Moreover, the overcharging current IBmax [A] can also be calculated by further multiplying an adjustment value $\eta$ taking durability and the like of the main battery 43 into consideration in accordance with the following formula.

$$IBmax = \eta \cdot \rho \cdot IBLT$$

Note that when the overcharging current IBmax is not defined as a rated current, it can be calculated in accordance with each formula as mentioned above.

Therefore, there is provided a first method of setting an equipment constant of the vehicle driving apparatus so that the aforementioned formula (1) is established. In the first method, an inductance Lm [mH] of the coil 33 corresponding to a resistance component R [$\Omega$] of the vehicle driving apparatus, and a conductor resistance between the terminals of the main battery 43 comprises the resistances such as the coil 33, the direct-current cables CB1 and CB2 and the like, that is, a conductor resistance between terminals Rm [m$\Omega$] are reduced.

Further, there is provided a second method in which a counter-electromotive voltage constant Ke [mV/rpm] =Emax/NMmax expressed by dividing a maximum counter-electromotive voltage E0 generated at a time when the weak field control can not be executed, that is, a maximum counter-electromotive voltage Emax [V] by a maximum value NMmax of the motor rotation speed NM is reduced, or the maximum value NMmax is reduced. In this case, since the engine 11 and the motor 25 are directly connected, the maximum value NMmax equals a maximum value NEmax of the engine rotation speed NE.

Further, in order to enlarge an output of the motor 25 corresponding to a property of the motor 25, and the motor torque TM, it is necessary to make the inductance Lm [mH] small or make the conductor resistance between terminals Rm [m$\Omega$] small. Also, it is preferable to increase the magnetic flux amount of the permanent magnet so as to make the counter-electromotive voltage E0 high. However, taking protection of the main battery 43 into consideration, it is desirable to employ the first and second methods.

In this case, the charging current Ib can be calculated in the following manner. Specifically, on the assumption that a number of a magnetic pole of the motor 25 is set to P, an impedance mainly of the coil 33 is set to Z, an electric voltage of the main battery 43 itself after taking out the wire connection is set to VBdc [V], an alternating current conversion value of the electric voltage VBdc is set to VBac, and an internal resistance of the main battery 43 is set to Rb [m$\Omega$], a resistance component R of the vehicle driving apparatus is expressed by the following formula.

$$R = (\pi^2/18) \cdot Rb + Rm$$

The alternating current conversion value VBac is expressed by the following formula.

$$VBac = (\pi/3) \cdot VBdc \cdot VB/\sqrt{} \qquad (6)$$

Further, a maximum angular velocity $\omega$ of the motor 25 is expressed by the following formula.

$$\omega = 2\pi \cdot (NMmax/60) \cdot (P/2)$$

Further, the impedance Z is expressed by the following formula.

$$Z = \sqrt{(R^2 + (\omega \cdot Lm)^2)}$$

An alternating current Im [A] generated in the coil 33 at a time when the weak field control can not be executed is expressed by the following formula.

$$Im = (-VBac \cdot R + \sqrt{(VBac^2 \cdot R^2 - Z^2 \cdot (VBac^2 - Emax^2))})/Z^2$$

The charging current Ib is expressed by the following formula.

$$Ib = Im \cdot p/\sqrt{} \qquad (6)$$

As mentioned above, it is possible to make the charging current Ib [A] smaller than the overcharging current IBmax by enlarging the resistance component R [$\Omega$] of the vehicle driving apparatus or making the counter-electromotive voltage constant Ke [mV/rpm] or the maximum value NMmax small. Therefore, it is possible to prevent the excess current from being supplied to the main battery 43 even when the weak field control can not be executed due to some kind of reason and the high counter-electromotive voltage E0 is generated, so that the main battery 43 is not overcharged. Further, it is not necessary to make the main relay 47 on the direct-current cables CB1 and CB2 large scaled, thereby making the vehicle driving apparatus compact.

Meanwhile, in the present embodiment, the structure is made such that the permanent magnets are arranged in a plurality of positions in the circumferential direction of the rotor 31, the salient poles integrally formed with the rotor core 34 are formed between the permanent magnets in the circumferential direction. The motor torque TM is generated by utilizing the combination of the magnet torque generated by the permanent magnet and the reluctance torque generated by the salient poles.

In this kind of motor 25, the structure is made such that a use ratio of each of the magnet torque and the reluctance torque is set. The use ratio of the reluctance torque is made higher, for the purpose of preventing the main battery 43 from being overcharged and generating a sufficient motor torque TM.

Accordingly, on the assumption that the torque constant is set to Tc [Nm/A·rms], a preset threshold value of a reluctance torque coefficient α expressing the use ratio α=Tc/Ke is set to be equal to or more than 40 in the present embodiment. In this case, the torque constant Tc can be calculated as follows. Specifically, on the assumption that an effective magnetic flux of a gap per one pole in the permanent magnets is set to φ [Wb], the effective magnetic flux φg is expressed by the following formula.

$$\phi g = 120 \cdot Ke/(2.22 \cdot P \cdot W \cdot Kw)$$

In this case, reference symbol W denotes a number of serial electric conductors in the motor 25, and reference symbol Kw denotes a winding factor of the coil 33.

Further, a flux linkage φ [Wb] by the permanent magnets is expressed by the following formula.

$$f = P \cdot t \cdot fg \cdot Kw \sqrt{(3/2)}$$

In this case, reference symbol t denotes a winding number of the coil 33.

In this case, the electric current Im can be expressed by the d-axis current IMd and the q-axis current IMq, and the following formula is established.

$$Im = \sqrt{(IMd^2 + IMq^2)/\sqrt{(3)}}$$

Further, assumingly, an armature self inductance of the axis d obtained by converting the inductance Lm into a value on the d-q axis model is set to Ld [H], and an armature self inductance of the axis q is set to Lq [H], there is established the following torque-current relation formula which expresses a relation between the motor torque TM, and the d-axis current IMd and the q-axis current IMq.

$$TM = (P/2) \cdot \phi \cdot IMq + (P/2) \cdot (Lq - Ld) \cdot (-Ld) \cdot IMq$$

Further, the torque constant Tc is expressed by the following formula.

$$Tc = (\sqrt{(3)} \cdot TM)/\sqrt{(IMd^2 + IMq^2)}$$

Accordingly, the reluctance torque coefficient α is expressed by the following formula (2).

$$\alpha = Tc/Ke$$

$$= (\sqrt{(3)} \cdot T)/(\sqrt{(IMd^2 + IMq^2)} \cdot Ke) \quad (2)$$

As mentioned above, it is preferable to set the counter-electromotive voltage constant Ke, the inductance Lm, the conductor resistance between terminals Rm and the maximum value NMmax in such a manner that the formula (1) mentioned above is satisfied and the reluctance torque coefficient α becomes equal to or more than 40.

Note that the actual charging current Ib[A] can be measured by a current sensor arranged in the inverter 29, or it can be measured by a current sensor arranged on the direct-current cables CB1 and CB2 that connect the inverter 29 and the main battery 43 when the motor 25 is driven at the maximum value NMmax of the motor rotation speed NM. Further, as mentioned above, since the engine 11 and the motor 25 are directly connected in the present embodiment, and thus the maximum value NMmax equals the maximum value NEmax. Therefore, it is possible to set a current measured by each current sensor when the engine 11 is rotated at the maximum value NEmax at which a lev limiter functions to be the charging current IB[A]. Note that when the engine 11 and the motor 25 are not directly connected, the maximum value NMmax is set to be the maximum motor rotation speed NE of the motor 25 on design.

Further, the actual maximum electrocounter voltage Emax [V] is calculated in the following manner. First, after the inverter 29 and the motor 25 are disconnected, the maximum voltage between two phase currents out of the each of the respective currents IMU, IMV, and IMW is measured, and the maximum voltage is divided by √(3) so as to obtain the maximum voltage value corresponding to one phase. Next, the maximum voltage value corresponding to one phase is divided by √(2) to obtain the effective value thereof. The actual maximum electrocounter voltage Emax [V] is calculated as the effective value.

Further, the actual torque constant Tc is calculated in the following manner. First, the currents IMU, IMV, and IMW are detected when the motor torque TM becomes the maximum, and the effective value is calculated based on the currents IMU, IMV, and IMW. Finally, the maximum motor torque TM is devided by the effective value to obtain the actual torque constant Tc.

Figure 3:
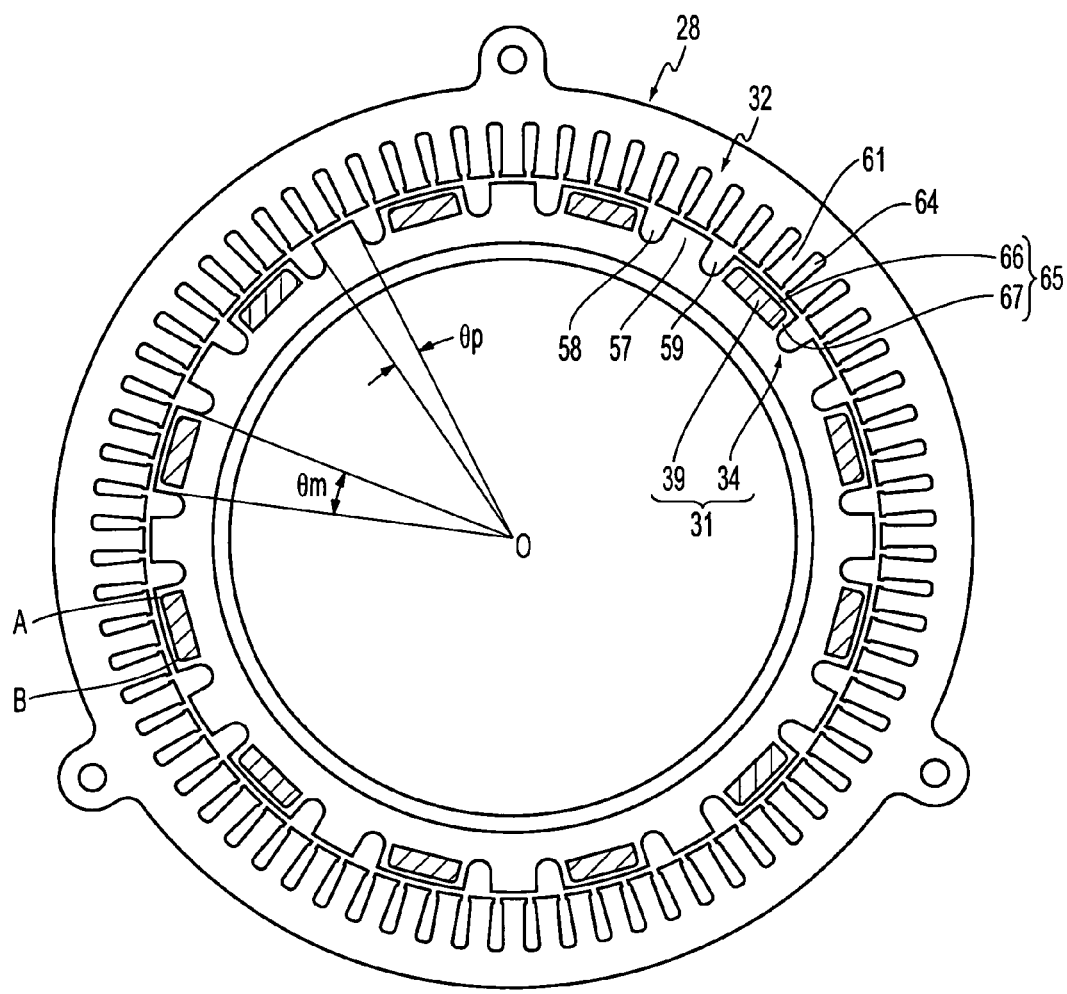
FIG. 3 is a view of a first example of a rotor according to the first embodiment of the invention.
Figure 4:
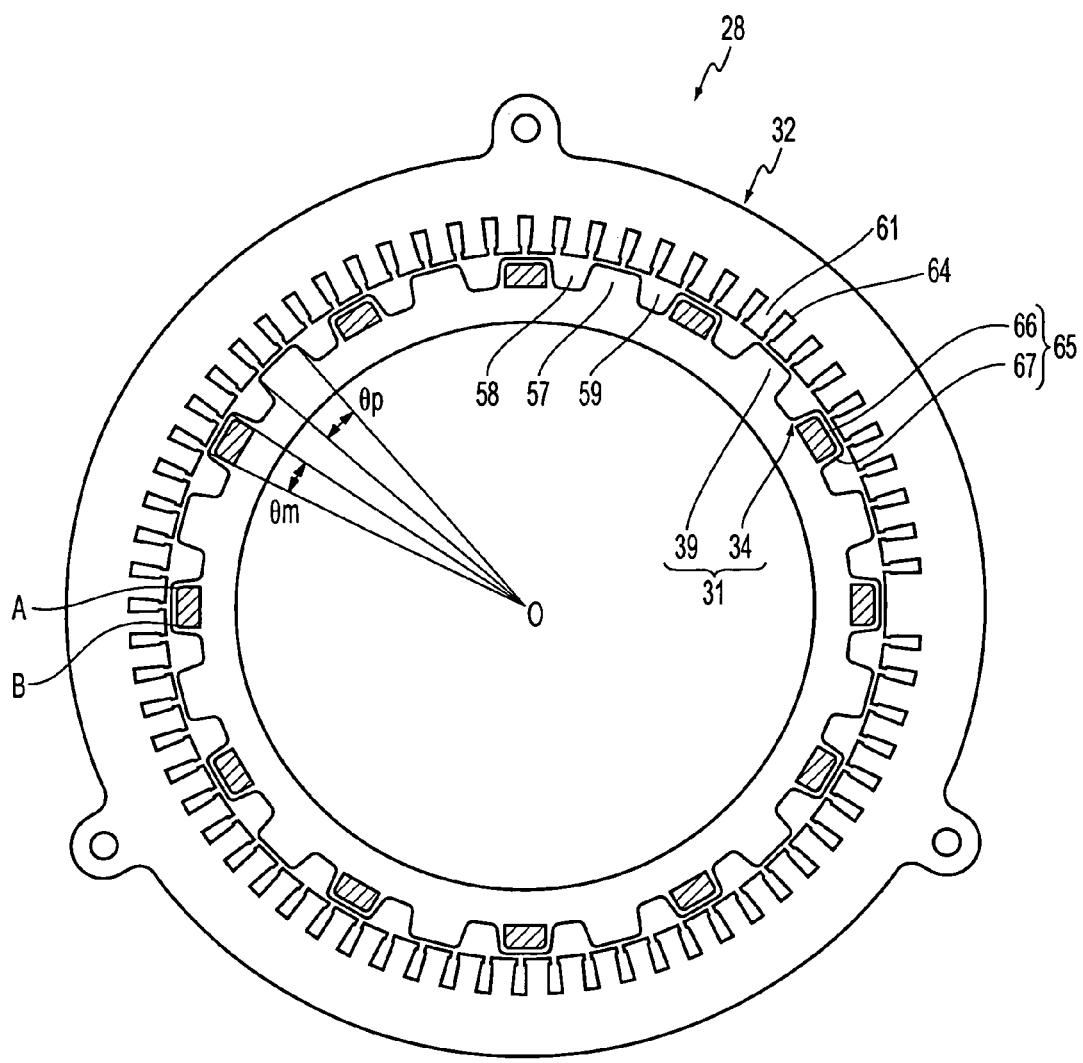
FIG. 4 is a view of a second example of a rotor according to the first embodiment of the invention.

Next, a description will be given of a structure of the motor 25. FIG. 3 is a view of a first example of a rotor according to the first embodiment of the invention. FIG. 4 is a view of a second example of a rotor according to the first embodiment of the invention.

In the drawings, reference numeral 28 denotes a stator, reference numeral 31 denotes a rotor, reference numeral 32 denotes a stator core, and reference numeral 34 denotes a rotor core. The rotor 31 is provided with the permanent magnets 39 arranged in a plurality of positions, in twelve positions in the present embodiment in a circumferential direction by a uniform pitch, and the salient poles 57 arranged in the center between the permanent magnets 39 by a uniform pitch, and grooves 58 and 59 are formed between the permanent magnets 39 and the salient poles 57. Further, a holding portion 65 that serves as a magnet portion is formed integrally with the rotor core 34 so as to surround the permanent magnet 39. The holding portion 65 holds the permanent magnet 39 against a centrifugal force at a time when the rotor 31 is rotated. Further, seventy two teeth 61 are formed in the stator core 32 so as to protrude toward an inner side in a radial direction by a uniform pitch, and a slot 64 is formed between the teeth portions 61.

In this case, on the assumption that an opening angle of the salient pole 57 in the circumferential direction of the rotor 31 is set to θp, it is necessary to maximize the reluctance torque generated in accordance with the driving of the motor 25 (FIG. 2) and to control the cogging torque generated in accordance with the driving of the motor 25 in order to minimize the vibration. Therefore, the opening angle θp is set to about a 45 [°] electrical angle. In this case, in the present embodiment, seventy two slots 64 are formed in the stator core 32, and six slots 64 are formed per one pole. In this case, the opening angle Op of 45 [°] corresponds to 1.5 slots 64, i.e., has a slot pitch of 1.5.

Further, on the assumption that the opening angle of the holding portion 65 in the circumferential direction of the rotor 31 is set to θm, it is necessary to prevent the main battery 43 from being overcharged and to minimize the cogging. Therefore, the opening angle θm is set to about a 15, 45 or 75 [°] electrical angle. In this case, the opening angle θm of 15, 45 or 75 [°] mentioned above corresponds to 0.5, 1.5 or 2.5 slots 64, i.e., as a slot pitch of 0.5, 1.5 or 2.5. FIG. 3 shows the example of the rotor 31 in which the opening angle θm is set to 75 [°], and FIG. 4 shows the example of the rotor 31 in which the opening angle θm is set to 45 [°].

When using the rotor provided with no holding portion 65, the permanent magnet itself forms the magnet portion, and the opening angle of the permanent magnet in the circumferential direction of the rotor (in FIG. 3 and FIG. 4, the rotor 31 is provided with the holding portion 65, however, if the rotor is not provided with the holding portion 65, an angle formed between a line connecting a point A and a point O and a line connecting a point B and the point O) is set to θm.

In this case, the permanent magnet 39 has a strip shape, is dug into an iron core of the rotor core 34, and is held by the holding portion 65 in the manner mentioned above. The holding portion 65 comprises a bridge portion 66 extending along the circumferential direction of the rotor 31 in an outer side of each of the permanent magnet 39 in the radial direction, and a connection portion 67 extending in the radial direction along a side wall of the permanent magnet 39. Further, the connection portion 67 has a narrow beam shape extending by a uniform thickness in order to minimize a leakage of the magnetic flux via the connection portion 67. In this case, since only a tensile force is applied to the connection portion 67, it is possible to set the connection portion 67 comparatively narrow.

Next, a description will be given of a second embodiment according to the invention. In this case, the same reference numerals are attached to the same elements as those of the first embodiment and a description thereof will be omitted.

Figure 5:
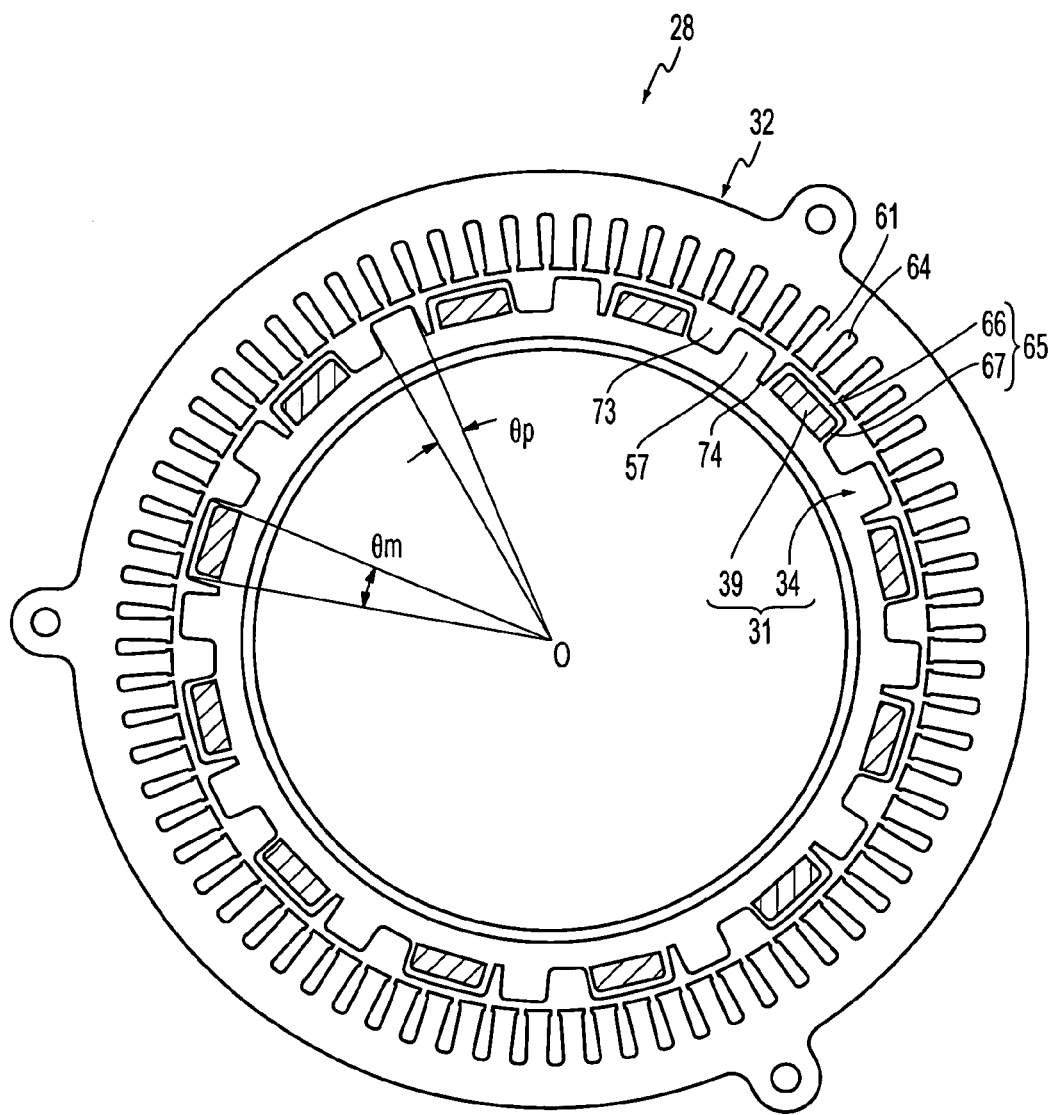
FIG. 5 is a view of an example of a rotor according to a second embodiment of the invention.
Figure 6:
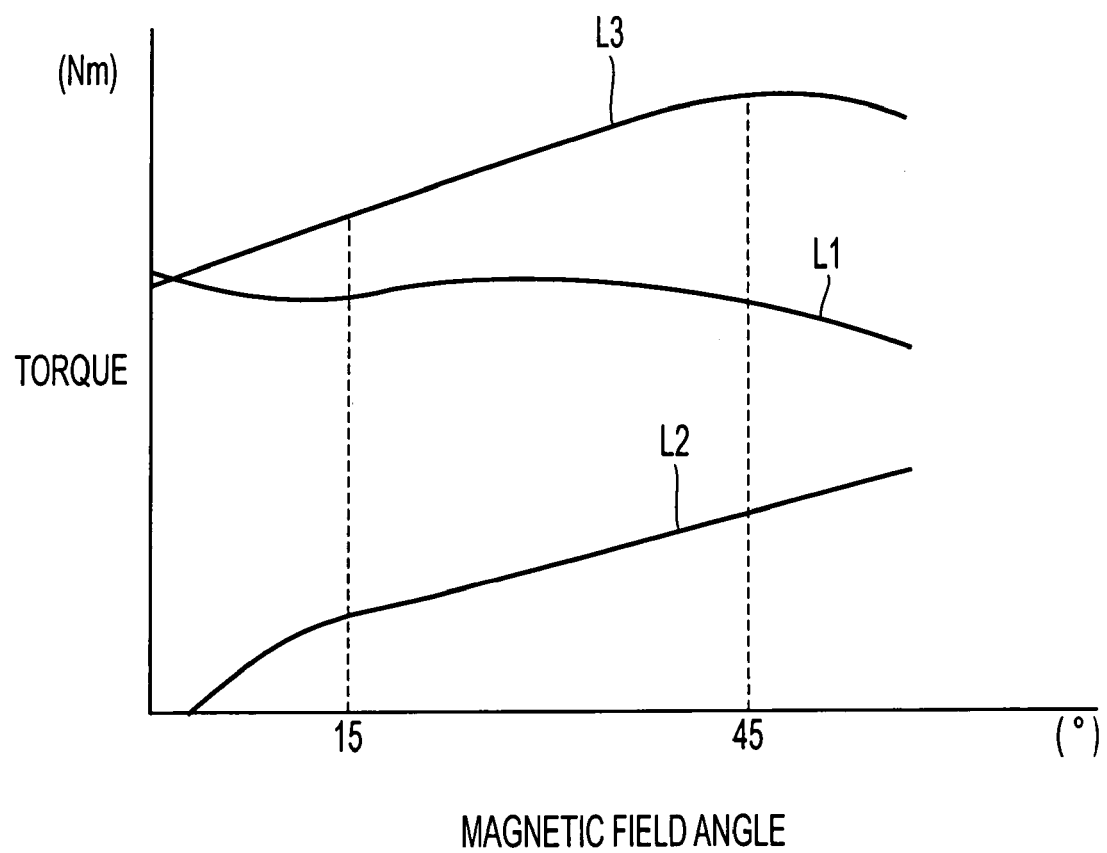
FIG. 6 is a view of a property of a motor according to the second embodiment of the invention.

FIG. 5 is a view of an example of a rotor according to the second embodiment of the invention, and FIG. 6 is a view of a property of a motor according to the second embodiment of the invention. In this case, in the drawing, a magnetic field angle is set to a horizontal axis expressing the current phase, and a torque is set to a vertical axis.

In the drawing, reference numeral 28 denotes a stator, reference numeral 31 denotes a rotor, reference numeral 32 denotes a stator core, and reference numeral 34 denotes a rotor core. The rotor 31 is provided with the permanent magnets 39 arranged in a plurality of positions, in twelve positions in the present embodiment in a circumferential direction by a uniform pitch, and the salient poles 57 arranged downstream from the center between the individual permanent magnets 39 by a uniform pitch in a rotation direction (a clockwise direction in FIG. 5) of the motor 25. A groove 73 is formed between the salient pole 57 and the permanent magnet 39 in an upstream side in the rotation direction, and a groove 74 is formed between the salient pole 57 and the permanent magnet 39 in a downstream side in the rotation direction. In this case, an electrical angle is larger in the groove 73 than in the groove 74. Further, a holding portion 65 that serves as a magnet portion is formed integrally with the rotor core 34 so as to surround the permanent magnet 39. The holding portion 65 holds the permanent magnet 39 against a centrifugal force at a time when the rotor 31 is rotated. Further, seventy two teeth 61 are formed in the stator core 32 so as to be protruded toward an inner side in a radial direction by a uniform pitch, and a slot 64 is formed between the teeth portions 61.

Further, it is necessary to minimize the reluctance torque generated in accordance with the driving of the motor 25 and to control the cogging torque generated in accordance with the driving of the motor 25 in order to minimize the vibration. Therefore, the opening angle θp is set to about 45 [°]. In this case, in the present embodiment, seventy two slots 64 are formed in the stator core 32, and six slots 64 are formed per one pole. In this case, the opening angle Op of 45 [°] corresponds to 1.5 slots 64.

Further, it is necessary to prevent the main battery 43 from being overcharged and to minimize the cogging torque. Therefore, the opening angle θm is set to about 15, 45 or 75 [°]. In this case, the opening angle θm of 15, 45 or 75 [°] mentioned above corresponds to 0.5, 1.5 or 2.5 slots 64. FIG. 5 shows the example of the rotor 31 in which the opening angle θm is set to 75 [°].

In this case, in accordance with the present embodiment, since the motor 25 is connected to the crank shaft 12, the motor 25 is rotated only in a forward direction, that is, in a clockwise direction in FIG. 5 in accordance with the driving of the engine 11 in a forward direction.

In this case, at a time of driving the motor 25, it is possible to express a position of an electromagnet formed by each of the coils 33 of the stator 28, that is, a position indicating a center of the magnetic field in a side of the stator 28 by the magnetic field angle, and the magnetic field angle is set to 0 [°] in a center position between the permanent magnets 39 in the circumferential direction, and a center position of each of the salient poles 57 in the circumferential direction.

Further, as shown by a line L1 in FIG. 6, the magnet torque generated by the permanent magnet 39 becomes maximum at the magnetic field angle of 0 [°]. Further, as shown by a line L2 in FIG. 6, the reluctance torque generated by the salient pole 57 becomes larger as the magnetic field angle is larger than 0 [°]. Accordingly, an added torque obtained by adding the magnetic torque to the reluctance torque becomes as shown by a line L3 in FIG. 6. As a result, it is possible to generate the motor torque TM expressed by the added torque.

Further, as shown in the first embodiment mentioned above, when the salient pole 57 is arranged in the center between the permanent magnets 39, the magnet torque and the reluctance torque, on the assumption that the magnetic field angle at a time of power running of the motor 25 is set to 30 [°], both employ values at the magnetic field angle of 30 [°] When displacing the salient pole 57 from the center between the permanent magnets 39 to a downstream side by the electrical angle of 15 [°], that is, 0.5 slots 64, in the case that the magnetic field angle at a time of power running of the motor 25 is set to 25 [°], the magnet torque employs a value at a time when the magnetic field angle is 25 [°], and the reluctance torque employs a value at a time when the magnetic field angle is 40 [°] which is obtained by adding 15 [°] to 25 [°]. Accordingly, since both of the magnet torque and the reluctance torque become large values, the added torque is further enlarged.

In this case, when regenerating the motor 25, the rotor 31 outputs the motor torque TM in the reverse direction. Accordingly, a polarity of the electromagnet of the stator 28 is set in reverse by adding the magnetic field angle of 180 [°] to the magnetic field angle at a time of power running. In this case, the motor torque TM becomes small, however, no problem is generated at a time of regenerating even in the case that the motor torque TM is small.

In this case, the invention is not limited to the embodiments mentioned above, and can be variously modified on the basis of the scope of the invention. These modifications are not excluded from the scope of the invention.

The invention claimed is:

1. A vehicle drive control apparatus, comprising:
a motor;
a battery and an inverter having a direct current supplied from a battery, wherein the inverter converts the direct current into an alternating current and supplies the alternating current to the motor; and
a controller that transmits a drive signal to the inverter so as to execute a weak field control, wherein:
a stator of the motor includes a plurality of teeth, so as to protrude toward an inner side radial direction by a uniform pitch, and a slot between the teeth,
a rotor of the motor is placed inside of the stator and includes a plurality of permanent magnets arranged in a plurality of portions in a circumferential direction and salient poles arranged between the permanent magnets, and
an opening angle of the salient poles is set to correspond to a slot pitch of 1.5, and an opening angle of the permanent magnets is set to correspond to a slot pitch of 0.5, 1.5 or 2.5, so that a reluctance torque coefficient is set to be equal to or more than 40, the reluctance torque coefficient calculated by dividing a torque constant, the torque constant calculated by dividing a motor torque constant by current supplied to the motor by a counter-electromotive constant, the counter-electromotive constant calculated by dividing a maximum counter-electromotive voltage generated at a time when execution of the weak field control is not allowed by a maximum value of a motor rotation speed.

2. The vehicle drive control apparatus according to claim 1, wherein the rotor further comprises a holding portion holding the permanent magnets and a connection portion, extending in a radial direction along side walls of the permanent magnets, that has a shape of a narrow beam with a uniform thickness.

3. The vehicle drive control apparatus according to claim 2, wherein the salient poles are arranged downstream of a center between the permanent magnets in a rotation direction of the motor and apart from the permanent magnets.

4. The vehicle drive control apparatus according to claim 1, wherein the salient poles are arranged downstream of a center between the permanent magnets in a rotation direction of the motor and apart from the permanent magnets.

5. The vehicle drive control apparatus according to claim 1, wherein the motor is directly connected to an output shaft of an engine.

6. The vehicle drive control apparatus according to claim 1, wherein the weak field control is executed by reducing an amount of magnetic flux formed by the rotor in the motor.

* * * * *